(12) United States Patent
Duque Biarge et al.

(10) Patent No.: US 12,025,696 B2
(45) Date of Patent: *Jul. 2, 2024

(54) VEHICLE RADAR SENSING SYSTEM WITH ENHANCED ANGLE RESOLUTION

(71) Applicant: Magna Electronics Inc., Auburn Hills, MI (US)

(72) Inventors: Sergio Duque Biarge, Munich (DE); Holger Hess, Hösbach (DE); Jorge J. Jácome Muñoz, Aschaffenburg (DE); Kalin Kabakchiev, Frankfurt Am Main (DE); Roaldje Nadjiasngar, Aschaffenburg (DE)

(73) Assignee: Magna Electronics Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,195

(22) Filed: Jul. 17, 2023

(65) Prior Publication Data

US 2024/0019571 A1 Jan. 18, 2024

Related U.S. Application Data

(63) Continuation of application No. 17/247,692, filed on Dec. 21, 2020, now Pat. No. 11,703,587, which is a (Continued)

(51) Int. Cl.
*G01S 13/931* (2020.01)
*G01S 13/44* (2006.01)
(Continued)

(52) U.S. Cl.
CPC .......... *G01S 13/931* (2013.01); *G01S 13/505* (2013.01); *G01S 13/9005* (2013.01);
(Continued)

(58) Field of Classification Search
CPC ............... G01S 13/4418; G01S 13/505; G01S 13/9005; G01S 13/9029; G01S 13/931;
(Continued)

(56) References Cited

U.S. PATENT DOCUMENTS

| 4,943,796 A | 7/1990 | Lee |
| 5,550,677 A | 8/1996 | Schofield et al. |

(Continued)

FOREIGN PATENT DOCUMENTS

| EP | 1506893 A2 | 2/2005 |
| EP | 2359159 A1 | 8/2011 |

(Continued)

OTHER PUBLICATIONS

Rapp et al. "Probabilistic ego-motion estimation using multiple automotive radar sensors." Robotics and Autonomous Systems 89, 136-146, 2017.

(Continued)

*Primary Examiner* — Timothy X Pham
(74) *Attorney, Agent, or Firm* — HONIGMAN LLP (57) ABSTRACT

A vehicular sensing system includes at least one radar sensor disposed at a vehicle and having a field of sensing exterior of the vehicle. The radar sensor includes multiple transmitting antennas and multiple receiving antennas. The at least one radar sensor is part of a suite of sensors that includes a forward viewing camera. Multiple scans of captured radar data are transferred from the at least one radar sensor to an electronic control unit. The system, via processing of transferred multiple scans of captured radar data and transferred image data, detects presence of a plurality of objects, generates a virtual antenna array with a virtual antenna aperture larger than a physical antenna aperture of the at least one radar sensor, and tracks the detected objects. The system, based at least in part on tracking detected objects, (Continued)

provides an output for at least one driving assist system of the vehicle.

26 Claims, 3 Drawing Sheets

Related U.S. Application Data continuation of application No. 16/123,265, filed on Sep. 6, 2018, now Pat. No. 10,877,148.

(60) Provisional application No. 62/555,222, filed on Sep. 7, 2017.

(51) Int. Cl.
 *G01S 13/50* (2006.01)
 *G01S 13/90* (2006.01)

(52) U.S. Cl.
 CPC ....... *G01S 13/9029* (2013.01); *G01S 13/4418* (2013.01); *G01S 2013/9314* (2013.01); *G01S 2013/9315* (2020.01); *G01S 2013/932* (2020.01)

(58) Field of Classification Search
 CPC ..... G01S 2013/9314; G01S 2013/9315; G01S 2013/932
 See application file for complete search history.

(56) References Cited

U.S. PATENT DOCUMENTS

| | | | |
|---|---|---|---|
| 5,585,798 A | 12/1996 | Yoshioka et al. |
| 5,670,935 A | 9/1997 | Schofield et al. |
| 5,715,093 A | 2/1998 | Schierbeek et al. |
| 5,796,094 A | 8/1998 | Schofield et al. |
| 5,877,897 A | 3/1999 | Schofield et al. |
| 5,949,331 A | 9/1999 | Schofield et al. |
| 6,057,754 A | 5/2000 | Kinoshita et al. |
| 6,067,110 A | 5/2000 | Nonaka et al. |
| 6,085,151 A | 7/2000 | Farmer et al. |
| 6,097,023 A | 8/2000 | Schofield et al. |
| 6,118,401 A | 9/2000 | Tognazzini |
| 6,118,410 A | 9/2000 | Nagy |
| 6,201,642 B1 | 3/2001 | Bos |
| 6,216,540 B1 | 4/2001 | Nelson et al. |
| 6,313,454 B1 | 11/2001 | Bos et al. |
| 6,353,392 B1 | 3/2002 | Schofield et al. |
| 6,396,397 B1 | 5/2002 | Bos et al. |
| 6,492,935 B1 | 12/2002 | Higuchi |
| 6,498,620 B2 | 12/2002 | Schofield et al. |
| 6,580,385 B1 | 6/2003 | Winner et al. |
| 6,587,186 B2 | 7/2003 | Bamji et al. |
| 6,674,895 B2 | 1/2004 | Rafii et al. |
| 6,678,039 B2 | 1/2004 | Charbon |
| 6,690,268 B2 | 2/2004 | Schofield et al. |
| 6,690,354 B2 | 2/2004 | Sze |
| 6,710,770 B2 | 3/2004 | Tomasi et al. |
| 6,717,610 B1 | 4/2004 | Bos et al. |
| 6,757,109 B2 | 6/2004 | Bos |
| 6,771,208 B2 | 8/2004 | Lutter et al. |
| 6,795,014 B2 | 9/2004 | Cheong |
| 6,825,455 B1 | 11/2004 | Schwarte |
| 6,831,591 B2 | 12/2004 | Horibe |
| 6,876,775 B2 | 4/2005 | Torunoglu |
| 6,903,677 B2 | 6/2005 | Takashima et al. |
| 6,906,793 B2 | 6/2005 | Bamji et al. |
| 6,919,549 B2 | 7/2005 | Bamji et al. |
| 6,941,211 B1 | 9/2005 | Kuroda et al. |
| 6,946,978 B2 | 9/2005 | Schofield |
| 7,004,606 B2 | 2/2006 | Schofield |
| 7,005,974 B2 | 2/2006 | McMahon et al. |
| 7,012,560 B2 | 3/2006 | Braeuchle et al. |
| 7,038,577 B2 | 5/2006 | Pawlicki et al. |
| 7,042,389 B2 | 5/2006 | Shirai |
| 7,053,357 B2 | 5/2006 | Schwarte |
| 7,123,168 B2 | 10/2006 | Schofield |
| 7,157,685 B2 | 1/2007 | Bamji et al. |
| 7,176,438 B2 | 2/2007 | Bamji et al. |
| 7,176,830 B2 | 2/2007 | Horibe |
| 7,203,356 B2 | 4/2007 | Gokturk et al. |
| 7,212,663 B2 | 5/2007 | Tomasi |
| 7,283,213 B2 | 10/2007 | O'Connor et al. |
| 7,310,431 B2 | 12/2007 | Gokturk et al. |
| 7,321,111 B2 | 1/2008 | Bamji et al. |
| 7,340,077 B2 | 3/2008 | Gokturk et al. |
| 7,352,454 B2 | 4/2008 | Bamji et al. |
| 7,375,803 B1 | 5/2008 | Bamji |
| 7,379,100 B2 | 5/2008 | Gokturk et al. |
| 7,379,163 B2 | 5/2008 | Rafii et al. |
| 7,405,812 B1 | 7/2008 | Bamji |
| 7,408,627 B2 | 8/2008 | Bamji et al. |
| 7,432,848 B2 | 10/2008 | Munakata |
| 7,526,103 B2 | 4/2009 | Schofield et al. |
| 7,613,568 B2 | 11/2009 | Kawasaki |
| 7,706,978 B2 | 4/2010 | Schiffmann et al. |
| 7,765,065 B2 | 7/2010 | Stiller |
| 8,013,780 B2 | 9/2011 | Lynam |
| 8,027,029 B2 | 9/2011 | Lu et al. |
| 8,698,894 B2 | 4/2014 | Briggance |
| 9,036,026 B2 | 5/2015 | Dellantoni et al. |
| 9,146,898 B2 | 9/2015 | Ihlenburg et al. |
| 9,575,160 B1 | 2/2017 | Davis et al. |
| 9,599,702 B1 | 3/2017 | Bordes et al. |
| 9,689,967 B1 | 6/2017 | Stark et al. |
| 9,753,121 B1 | 9/2017 | Davis et al. |
| 10,877,148 B2 | 12/2020 | Duque Biarge et al. |
| 11,703,587 B2 | 7/2023 | Duque Biarge et al. |
| 2003/0138132 A1 | 7/2003 | Stam et al. |
| 2003/0201929 A1 | 10/2003 | Lutter et al. |
| 2005/0104089 A1 | 5/2005 | Engelmann et al. |
| 2006/0091654 A1 | 5/2006 | De Mersseman et al. |
| 2010/0001897 A1 | 1/2010 | Lyman |
| 2010/0245066 A1 | 9/2010 | Sarioglu et al. |
| 2011/0037640 A1 | 2/2011 | Schmidlin |
| 2011/0148691 A1 | 6/2011 | Samaniego et al. |
| 2013/0215271 A1 | 8/2013 | Lu |
| 2014/0028494 A1 | 1/2014 | Ksienski et al. |
| 2014/0347207 A1 | 11/2014 | Zeng et al. |
| 2017/0222311 A1 | 8/2017 | Hess et al. |
| 2017/0254873 A1 | 9/2017 | Koravadi |
| 2017/0276788 A1 | 9/2017 | Wodrich |
| 2017/0310758 A1 | 10/2017 | Davis et al. |
| 2017/0315231 A1 | 11/2017 | Wodrich |
| 2017/0356994 A1 | 12/2017 | Wodrich et al. |
| 2018/0015875 A1 | 1/2018 | May et al. |
| 2018/0045812 A1 | 2/2018 | Hess |
| 2018/0059236 A1 | 3/2018 | Wodrich et al. |
| 2018/0065623 A1 | 3/2018 | Wodrich et al. |
| 2018/0067194 A1 | 3/2018 | Wodrich et al. |
| 2018/0231635 A1 | 8/2018 | Woehlte |
| 2019/0072666 A1 | 3/2019 | Duque Biarge et al. |
| 2019/0072667 A1 | 3/2019 | Duque Biarge et al. |
| 2019/0072669 A1 | 3/2019 | Duque Biarge et al. |
| 2020/0064483 A1 | 2/2020 | Li et al. |
| 2020/0096626 A1 | 3/2020 | Wang et al. |

FOREIGN PATENT DOCUMENTS

| | | |
|---|---|---|
| WO | 2011090484 A1 | 7/2011 |
| WO | 2018007995 A1 | 1/2018 |

OTHER PUBLICATIONS

Das et al., "Scan registration with multi-scale k-means normal distributions transform." Intelligent Robots and Systems (IROS), 2012 IEEE/RSJ International Conference on. IEEE, 2012.

Lundquist et al., "Estimation of the free space in front of a moving vehicle." 2009.

Schreier et al., "Robust free space detection in occupancy grid maps by methods of image analysis and dynamic B-spline contour tracking." Intelligent Transportation Systems (ITSC), 2012 15th (56) References Cited

OTHER PUBLICATIONS

International IEEE Conference on. IEEE, 2012.

VEHICLE RADAR SENSING SYSTEM WITH ENHANCED ANGLE RESOLUTION

CROSS REFERENCE TO RELATED APPLICATIONS

The present application is a continuation of U.S. patent application Ser. No. 17/247,692, filed Dec. 21, 2020, now U.S. Pat. No. 11,703,587, which is a continuation of U.S. patent application Ser. No. 16/123,265, filed Sep. 6, 2018, now U.S. Pat. No. 10,877,148, which claims the filing benefits of U.S. provisional application Ser. No. 62/555,222, filed Sep. 7, 2017, which is hereby incorporated herein by reference in its entirety.

FIELD OF THE INVENTION

The present invention relates generally to a vehicle sensing system for a vehicle and, more particularly, to a vehicle sensing system that utilizes one or more sensors at a vehicle to provide a field of sensing at or around the vehicle.

BACKGROUND OF THE INVENTION

Use of imaging sensors or ultrasonic sensors or radar sensors in vehicle sensing systems is common and known. Examples of such known systems are described in U.S. Pat. Nos. 8,013,780 and 5,949,331 and/or U.S. publication No. US-2010-0245066 and/or International Publication No. WO 2011/090484, which are hereby incorporated herein by reference in their entireties.

SUMMARY OF THE INVENTION

The present invention provides a driver assistance system or sensing system for a vehicle that utilizes a sensor module or system disposed at the vehicle and comprising at least one radar sensor disposed at the vehicle and having a field of sensing exterior of the vehicle. The at least one radar sensor comprises multiple Tx (transmitters) and Rx (receivers) to provide high definition, fine resolution in azimuth and/or elevation to determine high definition radar reflection responses for objects and surfaces detected by the system. The system includes a control, where outputs (such as radar data acquisitions of multiple scans) of the at least one radar sensor are communicated to the control, and where the control, responsive to the outputs of the at least one radar sensor, detects the presence of objects in the field of sensing of the radar sensor or sensors. The system uses multiple scans to synthesize a virtual aperture using the vehicle position change between the scans. The system provides enhanced accuracy in determining the location of a detected object relative to the vehicle and sensor(s).

The present invention provides a means to substantially or drastically improve the ability of an automotive radar system to distinguish different targets in the angle dimension. The system synthesizes a virtual aperture using the vehicle movement between scans. This Synthetic Aperture (SA) or synthesized aperture can be quite long depending on the number of integrated scans, vehicle velocity and scan dwell time. In order to be able to separate at least two targets within a nominal angle resolution, the minimum number of scans to be integrated is three.

These and other objects, advantages, purposes and features of the present invention will become apparent upon review of the following specification in conjunction with the drawings.

DESCRIPTION OF THE PREFERRED EMBODIMENTS

A vehicle sensing system, such as a driver assist system, object detection system, parking assist system and/or alert system, operates to capture sensing data exterior of the vehicle and may process the captured data to detect objects or other vehicles at or near the equipped vehicle and in the predicted path of the equipped vehicle, such as to assist a driver of the equipped vehicle in maneuvering the vehicle in a forward or rearward direction or to assist the driver in parking the vehicle in a parking space. The system includes a processor that is operable to receive sensing data from one or more sensors and to provide an output to a control that, responsive to the output, generates an alert or controls an accessory or system of the vehicle, or highlights or overlays an alert on a display screen (that may be displaying video images captured by a single rearward viewing camera or multiple cameras providing forward, side or 360 degree surround views of the area surrounding the vehicle during a reversing or low speed maneuver of the vehicle).

Figure 1:
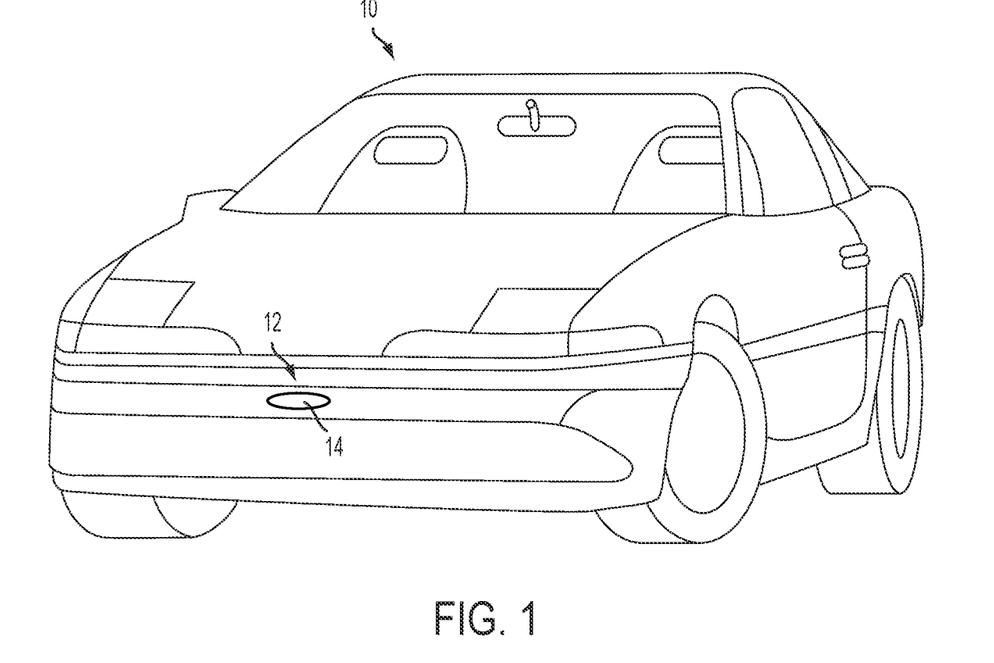
FIG. 1 is a perspective view of a vehicle with a sensing system that incorporates a radar sensor in accordance with the present invention.

Referring now to the drawings and the illustrative embodiments depicted therein, a vehicle 10 includes an driver assistance system or sensing system 12 that includes at least one radar sensor unit, such as a forward facing radar sensor unit 14 (and the system may optionally include multiple exterior facing sensors, such as multiple exterior facing radar sensors or cameras or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) or processor that is operable to process data captured by the sensor or sensors and may detect objects or the like. The data transfer or signal communication from the sensor to the ECU may comprise any suitable data or communication link, such as a vehicle network bus or the like of the equipped vehicle.

Some automotive radars use MIMO (Multiple Input Multiple Output) techniques to create an effective virtual antenna aperture, which is significantly larger than the real antenna aperture, and delivers much better angular resolution than conventional radars, such as, for example, conventional scanning radars.

Algorithms to estimate target positioning on automotive radar typically either use a coherent single scan or an incoherent set of scans. When using a single scan coherently, the algorithm uses the complex value of the different antenna phase centers for a certain range and carry out a beamforming (BF) in order to obtain the angular position of the target. In this case, the ability to separate two targets separated by a narrow angle is driven by the physical antenna array size. The second type of target positioning utilizes a set of scans incoherently, and receives as inputs a set of target list outputs from different scans (similar to the first example). In this case, the resolution is not improved per se. Two targets close by in angle will be reported as two separate targets only when they present sufficient difference in angle. For example, two vehicles far away that are in adjacent lanes may be seen as a single vehicle. However, as they get closer to the subject vehicle, they may eventually present enough angle difference to be seen or sensed as two separate targets. Thus, at that moment, the system identifies as two targets what it was earlier or previously sensing as just one target.

The system of the present invention substantially improves the ability of an automotive radar to distinguish different targets in the angle dimension by synthesizing a virtual aperture using the car movement between scans. This allows the system to use coherent integration through a different set of scans in order to distinguish targets close by in angle in just a few scans. To this end, the system of the present invention generates a virtual array by the vehicle position change between scans. For example, a vehicle moving at 80 km/h with a radar scan time of 30 ms yields in a virtual array size of 0.67 meters with two scans (that is, the vehicle will travel 0.67 meters between scans), 1.33 m using 3 scans and 6 m using 10 scans. Thus, the formed virtual array with several phase centers is significantly larger with respect to the physical antenna array size.

The separation between contiguous phase centers is related to distance travelled by the vehicle between scans. That distance is most likely large enough to get grating lobes within a few degrees. Thus, the use of this technique requires knowledge in advance in order to avoid confusing main lobes with grating lobes. This advanced knowledge may be provided by a single scan Angle of Arrival (AoA) estimation. This implies that the maximum AoA estimation error is lower than the separation between the main lobe and the grating lobe.

The system of the present invention receives as input an ego motion estimation (an estimation of the motion of the measuring sensor disposed at the equipped or subject vehicle), a time stamp of each data acquisition or scan, a detection list for each scan with detected targets position, Doppler velocity and complex value after beamforming, and a sensor position of the measuring sensor with respect to the vehicle.

The dataflow includes matching the targets between scans. For every target, there is a series of complex values which come from the detection list of every scan. For every target and scan, this value is obtained after beamforming.

The next step is to "flatten" the phases by taking into account the vehicle movement and the estimated target positioning by the scans. This "phase flattening" can be done as a geometric approach by taking into account the different positions of the radar sensor and targets. The remaining phases are relative to the first position which will be 0 degrees.

Then, the system performs an assessment to check if it is possible to estimate the AoA without ambiguity. In essence, this tests if the scans maximum AoA error is within grating lobes. Targets with high SNR are more likely to be solved unambiguously. An AoA estimation is applied over the complex series within the angle dynamic range between grating lobes. Finally, the system reports the found targets using the long synthetic aperture (SA). This SA may be quite long depending on the number of integrated scans, vehicle velocity and scan dwell time. In order to be able to separate at least two targets within the nominal angle resolution, ideally the number of scans integrated is at least three.

Figure 2:
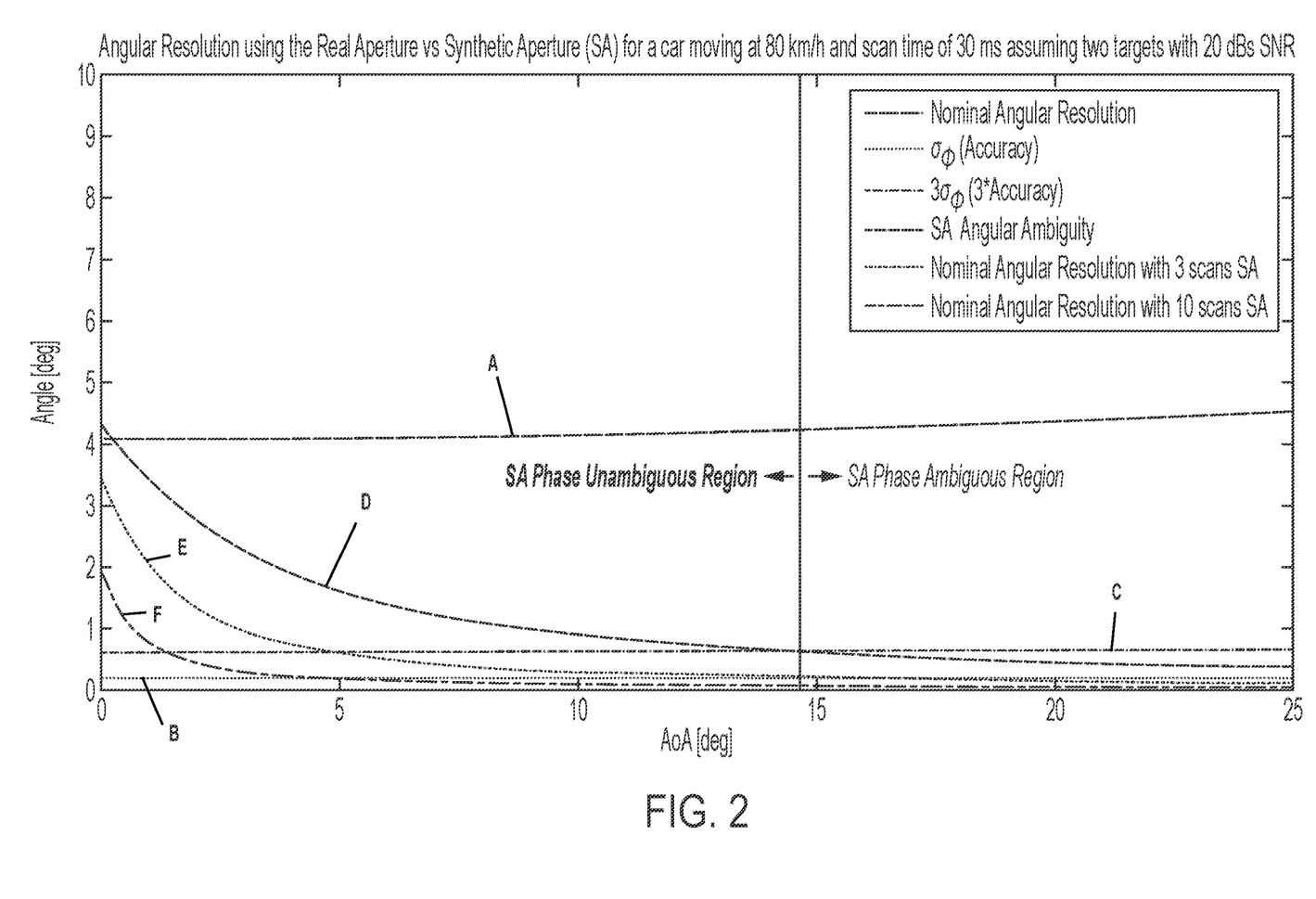
FIG. 2 is a graph showing azimuth angle resolution comparison between the present invention and a single scan estimation for a target with a SNR of 20 dBs.
Figure 3:
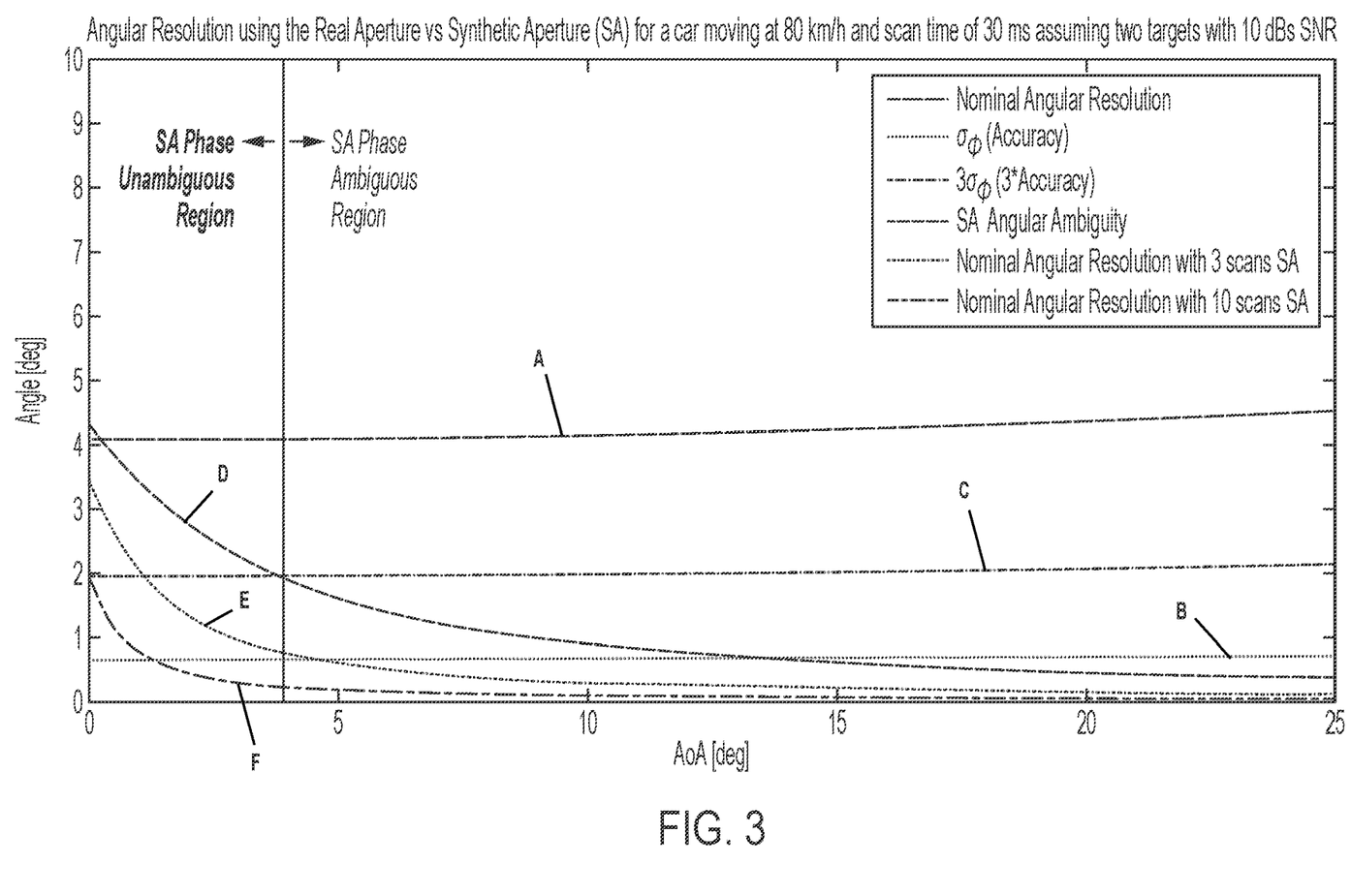
FIG. 3 is a graph showing azimuth angle resolution comparison between the present invention and a single scan estimation for a target with a SNR of 10 dBs.

For example, for an Azimuth dimension, the following parameters may be taken into account: vehicle velocity of 80 km/h, scan time of 30 ms, sensor frequency of 79 GHz (wavelength of 3.8 mm), 7 physical phase centers, and a 2 wavelength separation between physical phase centers. FIGS. 2 and 3 show the resolution improvement vs nominal Azimuth Angle Resolution assuming 20 dBs SNR (FIG. 2) and 10 dBs SNR (FIG. 3).

The curve A is the nominal resolution for different AoA and taking into account the single scan physical aperture. The accuracy is plotted as a solid line B and a dashed line C for one sigma and three sigmas, respectively. The line D represents the separation between grating lobes versus AoA. Thus, the SA Phase Unambiguous Region is defined as the region where three times sigma is below the grating lobe separation curve D. Finally, an example resolution is given by standard beamforming with a SA using three scans (see solid line E) and ten scans (see dashed line F).

As can be seen with reference to FIGS. 2 and 3, targets with a higher SNR show a wider angle Unambiguous Region (the region to the left of the vertical line in FIGS. 2 and 3) than weak targets or targets with a lower SNR. The resolution power quickly falls below 1 degree without using any super-resolution estimation method. As an example, an SA with 10 scans may separate targets around approximately 5 degrees of AoA with 0.18 degree resolution employing a simple beamforming.

The system of the present invention thus substantially improves the ability of an automotive radar to distinguish different targets in the angle dimension. The system synthesizes a virtual aperture using the vehicle movement between scans. The Synthetic Aperture (SA) can be quite long depending on the number of integrated scans, vehicle velocity and scan dwell time. In order to be able to separate at least two targets within the nominal angle resolution, the minimum number of scans to be integrated is preferably three.

The system may provide an output for a driving assist system of the vehicle, such as one or more of (i) automated parking, (ii) blind spot detection, (iii) cross traffic alert, (iv) lane change assist, (v) lane merge assist, (vi) automatic emergency braking, (vii) pedestrian detection, (viii) turn assist, (ix) terrain management, (x) collision mitigation and (xi) intersection collision mitigation. Optionally, the output may be provided to an autonomous vehicle control system.

For autonomous vehicles suitable for deployment with the system of the present invention, an occupant of the vehicle may, under particular circumstances, be desired or required to take over operation/control of the vehicle and drive the vehicle so as to avoid potential hazard for as long as the autonomous system relinquishes such control or driving. Such occupant of the vehicle thus becomes the driver of the autonomous vehicle. As used herein, the term "driver" refers to such an occupant, even when that occupant is not actually driving the vehicle, but is situated in the vehicle so as to be able to take over control and function as the driver of the vehicle when the vehicle control system hands over control to the occupant or driver or when the vehicle control system is not operating in an autonomous or semi-autonomous mode.

Typically an autonomous vehicle would be equipped with a suite of sensors, including multiple machine vision cameras deployed at the front, sides and rear of the vehicle, multiple radar sensors deployed at the front, sides and rear of the vehicle, and/or multiple lidar sensors deployed at the front, sides and rear of the vehicle. Typically, such an autonomous vehicle will also have wireless two way communication with other vehicles or infrastructure, such as via a car2car (V2V) or car2x communication system. The forward viewing camera and/or the sensor of the lane determining system may comprise one of the cameras and/or one of the sensors of the autonomous vehicle control system.

The sensing system may include a machine vision system (comprising at least one exterior viewing camera disposed at the vehicle and an image processor for processing image data captured by the at least one camera), where information is shared between the stereo radar and the machine vision system.

The system may include two or more individual radars, having individual or multiple Tx (transmitters) and Rx (receivers) on an antenna array, and may utilize aspects of the systems described in U.S. Pat. Nos. 9,753,121; 9,689,967; 9,599,702; 9,575,160; 9,146,898; 9,036,026; 8,027,029; 8,013,780; 6,825,455; 7,053,357; 7,408,627; 7,405,812; 7,379,163; 7,379,100; 7,375,803; 7,352,454; 7,340,077; 7,321,111; 7,310,431; 7,283,213; 7,212,663; 7,203,356; 7,176,438; 7,157,685; 6,919,549; 6,906,793; 6,876,775; 6,710,770; 6,690,354; 6,678,039; 6,674,895 and/or 6,587,186, and/or International Publication Nos. WO 2018/007995 and/or WO 2011/090484, and/or U.S. Publication Nos. US-2018-0231635; US-2018-0045812; US-2018-0015875; US-2017-0356994; US-2017-0315231; US-2017-0276788; US-2017-0254873; US-2017-0222311, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular sensing system, the vehicular sensing system comprising:
   at least one radar sensor disposed at a vehicle equipped with the vehicular sensing system, the at least one radar sensor having a field of sensing exterior of the equipped vehicle;
   wherein the at least one radar sensor comprises multiple transmitting antennas and multiple receiving antennas;
   wherein the at least one radar sensor is part of a suite of sensors disposed at the equipped vehicle, and wherein the suite of sensors further comprises a forward viewing camera disposed at the equipped vehicle;
   wherein the at least one radar sensor is operable to capture multiple scans of radar data;
   wherein multiple scans of radar data captured by the at least one radar sensor are transferred from the at least one radar sensor to an electronic control unit (ECU) disposed at the equipped vehicle;
   wherein image data captured by the forward viewing camera is transferred from the forward viewing camera to the ECU;
   wherein transferred multiple scans of captured radar data are processed at the ECU;
   wherein the vehicular sensing system, responsive to processing at the ECU of transferred multiple scans of captured radar data and transferred image data, detects presence of a plurality of objects exterior the equipped vehicle and within the field of sensing of the at least one radar sensor and within a field of view of the forward viewing camera;
   wherein the vehicular sensing system, responsive at least in part to processing at the ECU of transferred multiple scans of captured radar data, generates a virtual antenna array with a virtual antenna aperture larger than a physical antenna aperture of the at least one radar sensor;
   wherein the vehicular sensing system, using the generated virtual antenna array, tracks objects detected via processing at the ECU of two or more transferred multiple scans of captured radar data; and
   wherein the vehicular sensing system, based at least in part on tracking objects detected in transferred multiple scans, provides an output for at least one driving assist system of the equipped vehicle, and wherein the at least one driving assist system comprises at least one selected from the group consisting of (i) a blind spot detection system of the equipped vehicle, (ii) a cross traffic alert system of the equipped vehicle, (iii) a lane change assist system of the equipped vehicle, (iv) a lane merge assist system of the equipped vehicle, (v) an automatic emergency braking system of the equipped vehicle, (vi) a pedestrian detection system of the equipped vehicle, (vii) a turn assist system of the equipped vehicle, (viii) a terrain management system of the equipped vehicle, (ix) a collision mitigation system of the equipped vehicle and (x) an intersection collision mitigation system of the equipped vehicle.

2. The vehicular sensing system of claim 1, wherein the vehicular sensing system, responsive at least in part to processing at the ECU of transferred multiple scans of captured radar data, determines separation between two detected objects by tracking the two detected objects over two or more scans.

3. The vehicular sensing system of claim 1, wherein the transferred multiple scans of captured radar data comprises radar data acquisitions for at least three consecutive scans by the at least one radar sensor.

4. The vehicular sensing system of claim 3, wherein each radar data acquisition is time stamped.

5. The vehicular sensing system of claim 4, wherein the ECU receives a detection list for each scan with detected objects' positions, Doppler velocities and complex values.

6. The vehicular sensing system of claim 5, wherein the vehicular sensing system determines respective angles toward respective detected objects responsive at least in part to a sensor position of the at least one radar sensor at the equipped vehicle.

7. The vehicular sensing system of claim 3, wherein the vehicular sensing system flattens phases by taking into account estimated object positioning by the scans.

8. The vehicular sensing system of claim 7, wherein the vehicular sensing system determines if a maximum angle of arrival error of the scans is within grating lobes emitted by the transmitting antennas.

9. The vehicular sensing system of claim 8, wherein the vehicular sensing system applies an angle of arrival estimation over a complex series within an angle dynamic range between the grating lobes.

10. The vehicular sensing system of claim 1, wherein information is shared between the vehicular sensing system and a vision system of the equipped vehicle, the vision system comprising the forward viewing camera and an image processor for processing image data captured by the forward viewing camera.

11. The vehicular sensing system of claim 1, wherein the vehicular sensing system comprises two or more individual radar sensors, each respective radar sensor having multiple transmitting antennas and receiving antennas, and wherein information is shared between the individual radar sensors operating in stereo to determine high definition radar reflection responses for objects detected by the vehicular sensing system.

12. The vehicular sensing system of claim 1, wherein the at least one radar sensor is disposed at a front portion of the equipped vehicle and senses at least forward of the equipped vehicle.

13. The vehicular sensing system of claim 1, wherein the plurality of objects includes at least one other vehicle within the field of sensing of the at least one radar sensor, and wherein the vehicular sensing system provides an output for the automatic emergency braking system of the equipped vehicle.

14. The vehicular sensing system of claim 1, wherein the plurality of objects includes at least one pedestrian within the field of sensing of the at least one radar sensor, and wherein the vehicular sensing system provides an output for the pedestrian detection system of the equipped vehicle.

15. The vehicular sensing system of claim 1, wherein the plurality of objects includes at least one other vehicle within the field of sensing of the at least one radar sensor, and wherein the vehicular sensing system provides an output for the intersection collision mitigation system of the equipped vehicle.

16. The vehicular sensing system of claim 1, wherein the vehicular sensing system provides an output for (i) the automatic emergency braking system of the equipped vehicle and (ii) the pedestrian detection system of the equipped vehicle.

17. The vehicular sensing system of claim 1, wherein the suite of sensors further comprises at least one lidar sensor disposed at the equipped vehicle, and wherein sensor data captured by the at least one lidar sensor is transferred from the at least one lidar sensor to the ECU.

18. A vehicular sensing system, the vehicular sensing system comprising:
  at least one radar sensor disposed at a front portion of a vehicle equipped with the vehicular sensing system, the at least one radar sensor having a field of sensing at least forward of the equipped vehicle;
  wherein the at least one radar sensor comprises multiple transmitting antennas and multiple receiving antennas;
  wherein the at least one radar sensor is part of a suite of sensors disposed at the equipped vehicle, and wherein the suite of sensors further comprises a forward viewing camera disposed at the equipped vehicle;
  wherein the at least one radar sensor is operable to capture multiple scans of radar data;
  wherein multiple scans of radar data captured by the at least one radar sensor are transferred from the at least one radar sensor to an electronic control unit (ECU) disposed at the equipped vehicle;
  wherein image data captured by the forward viewing camera is transferred from the forward viewing camera to the ECU;
  wherein transferred multiple scans of captured radar data are processed at the ECU;
  wherein the vehicular sensing system, responsive to processing at the ECU of transferred multiple scans of captured radar data and transferred image data, detects presence of a plurality of objects exterior the equipped vehicle and within the field of sensing of the at least one radar sensor and within a field of view of the forward viewing camera;
  wherein the vehicular sensing system, responsive at least in part to processing at the ECU of transferred multiple scans of captured radar data, generates a virtual antenna array with a virtual antenna aperture larger than a physical antenna aperture of the at least one radar sensor;
  wherein the vehicular sensing system, using the generated virtual antenna array, tracks objects detected via processing at the ECU of two or more transferred multiple scans of captured radar data;
  wherein the vehicular sensing system, based at least in part on tracking objects detected in transferred multiple scans, provides an output for at least one driving assist system of the equipped vehicle, and wherein the at least one driving assist system comprises at least one selected from the group consisting of (i) a blind spot detection system of the equipped vehicle, (ii) a cross traffic alert system of the equipped vehicle, (iii) a lane change assist system of the equipped vehicle, (iv) a lane merge assist system of the equipped vehicle, (v) an automatic emergency braking system of the equipped vehicle, (vi) a pedestrian detection system of the equipped vehicle, (vii) a turn assist system of the equipped vehicle, (viii) a terrain management system of the equipped vehicle, (ix) a collision mitigation system of the equipped vehicle and (x) an intersection collision mitigation system of the equipped vehicle;
  wherein the forward viewing camera is part of a vision system of the equipped vehicle; and
  wherein information is shared between the vehicular sensing system and the vision system.

19. The vehicular sensing system of claim 18, wherein the vehicular sensing system, responsive at least in part to processing at the ECU of transferred multiple scans of captured radar data, determines separation between two detected objects by tracking the two detected objects over two or more scans.

20. The vehicular sensing system of claim 18, wherein the vehicular sensing system comprises two or more individual radar sensors, each respective radar sensor having multiple transmitting antennas and receiving antennas, and wherein information is shared between the individual radar sensors operating in stereo to determine high definition radar reflection responses for objects detected by the vehicular sensing system.

21. The vehicular sensing system of claim 18, wherein the plurality of objects includes at least one other vehicle within the field of sensing of the at least one radar sensor, and wherein the vehicular sensing system provides an output for the automatic emergency braking system of the equipped vehicle.

22. The vehicular sensing system of claim 18, wherein the plurality of objects includes at least one pedestrian within the field of sensing of the at least one radar sensor, and wherein the vehicular sensing system provides an output for the pedestrian detection system of the equipped vehicle.

23. The vehicular sensing system of claim 18, wherein the plurality of objects includes at least one other vehicle within the field of sensing of the at least one radar sensor, and wherein the vehicular sensing system provides an output for the intersection collision mitigation system of the equipped vehicle.

24. A vehicular sensing system, the vehicular sensing system comprising:
  at least one radar sensor disposed at a front portion of a vehicle equipped with the vehicular sensing system, the at least one radar sensor having a field of sensing at least forward of the equipped vehicle;
  wherein the at least one radar sensor comprises multiple transmitting antennas and multiple receiving antennas;

wherein the at least one radar sensor is part of a suite of sensors disposed at the equipped vehicle, and wherein the suite of sensors further comprises a forward viewing camera disposed at the equipped vehicle;

wherein the at least one radar sensor is operable to capture multiple scans of radar data;

wherein multiple scans of radar data captured by the at least one radar sensor are transferred from the at least one radar sensor to an electronic control unit (ECU) disposed at the equipped vehicle;

wherein image data captured by the forward viewing camera is transferred from the forward viewing camera to the ECU;

wherein transferred multiple scans of captured radar data are processed at the ECU;

wherein the vehicular sensing system, responsive to processing at the ECU of transferred multiple scans of captured radar data and transferred image data, detects presence of a plurality of objects exterior the equipped vehicle and within the field of sensing of the at least one radar sensor and within a field of view of the forward viewing camera;

wherein the vehicular sensing system, responsive at least in part to processing at the ECU of transferred multiple scans of captured radar data, generates a virtual antenna array with a virtual antenna aperture larger than a physical antenna aperture of the at least one radar sensor;

wherein the vehicular sensing system, using the generated virtual antenna array, tracks objects detected via processing at the ECU of two or more transferred multiple scans of captured radar data; and wherein at least one selected from the group consisting of (i) the plurality of objects includes at least one pedestrian within the field of sensing of the at least one radar sensor, and wherein, based at least in part on tracking the at least one pedestrian, the vehicular sensing system provides an output for a pedestrian detection system of the equipped vehicle, and (ii) the plurality of objects includes at least one other vehicle within the field of sensing of the at least one radar sensor, and wherein, based at least in part on tracking the other vehicle, the vehicular sensing system provides an output for a collision mitigation system of the equipped vehicle.

25. The vehicular sensing system of claim 24, wherein the vehicular sensing system, responsive at least in part to processing at the ECU of transferred multiple scans of captured radar data, determines separation between two detected objects by tracking the two detected objects over two or more scans.

26. The vehicular sensing system of claim 24, wherein the vehicular sensing system comprises two or more individual radar sensors, each respective radar sensor having multiple transmitting antennas and receiving antennas, and wherein information is shared between the individual radar sensors operating in stereo to determine high definition radar reflection responses for objects detected by the vehicular sensing system.

* * * * *